US010404694B2

(12) United States Patent
Suwald (10) Patent No.: US 10,404,694 B2
(45) Date of Patent: Sep. 3, 2019

(54) MOBILE DEVICE, METHOD OF AUTHENTICATING A USER, COMPUTER PROGRAM, ARTICLE OF MANUFACTURE, DISPLAY

(71) Applicant: NXP B.V., Eindhoven (NL)

(72) Inventor: Thomas Suwald, Hamburg (DE)

(73) Assignee: NXP B.V., Eindhoven (NL)

( * ) Notice: Subject to any disclaimer, the term of this patent is extended or adjusted under 35 U.S.C. 154(b) by 164 days.

(21) Appl. No.: 14/728,855

(22) Filed: Jun. 2, 2015

(65) Prior Publication Data

US 2015/0350203 A1 Dec. 3, 2015

(30) Foreign Application Priority Data

Jun. 3, 2014 (EP) ..................................... 14170892

(51) Int. Cl.
*H04L 29/06* (2006.01)
*H04W 12/06* (2009.01)
*G06F 21/36* (2013.01)

(52) U.S. Cl.
CPC .......... *H04L 63/0861* (2013.01); *G06F 21/36* (2013.01); *H04W 12/06* (2013.01)

(58) Field of Classification Search
CPC combination set(s) only.
See application file for complete search history.

(56) References Cited

U.S. PATENT DOCUMENTS

| 6,209,104 | B1 | 3/2001 | Jalili |
| 2003/0210127 | A1 | 11/2003 | Anderson |
| 2004/0093527 | A1* | 5/2004 | Pering ................. G06F 21/36 726/5 |
| 2004/0230843 | A1* | 11/2004 | Jansen .................. G06F 21/36 726/7 |
| 2007/0094717 | A1* | 4/2007 | Srinivasan ............ G06F 21/36 726/5 |
| 2007/0277224 | A1 | 11/2007 | Osborn et al. |
| 2008/0215879 | A1* | 9/2008 | Williams ............. G06Q 10/107 713/159 |

(Continued)

FOREIGN PATENT DOCUMENTS

CN 1856782 A 11/2006
WO 93/11511 6/1993

OTHER PUBLICATIONS

Extended European Search Report for Patent Appln. No. 14170892.5 (dated Aug. 4, 2014).

*Primary Examiner* — Mahfuzur Rahman (57) ABSTRACT

There is disclosed a mobile device comprising a processing unit for executing a host application, a user-interactive display and an authentication unit; wherein the authentication unit is arranged to receive an authentication request from the host application; wherein the authentication unit is arranged to cause the display to show a set of pictures in response to receiving the authentication request; wherein the authentication unit is further arranged to identify a selection of at least one picture from said set of pictures; and wherein the authentication unit is further arranged to initiate a verification of said identified selection. Furthermore, a corresponding method of authenticating a user is disclosed, as well as a corresponding computer program, an article of manufacture and a display.

13 Claims, 4 Drawing Sheets

(56) References Cited

U.S. PATENT DOCUMENTS

2009/0172810 A1* 7/2009 Won ................. G06F 21/36
    726/19
2013/0340063 A1* 12/2013 Larsson ............ G06F 21/335
    726/9

* cited by examiner

MOBILE DEVICE, METHOD OF AUTHENTICATING A USER, COMPUTER PROGRAM, ARTICLE OF MANUFACTURE, DISPLAY

CROSS-REFERENCE TO RELATED APPLICATIONS

This application claims the priority under 35 U.S.C. § 119 of European patent application no. 14170892.5, filed on Jun. 3, 2014, the contents of which are incorporated by reference herein.

FIELD

The present disclosure relates to a mobile device. Furthermore, the present disclosure relates to a method of authenticating a user and to a corresponding computer program, article of manufacture and display.

Today, many applications which are executed on mobile devices require some form of user authentication. For example, a personal identification number (PIN) may be required for unlocking the functionality of a given application. Other forms of authentication may also be applied. For example, a smart phone may have an integrated fingerprint sensor for secure user authentication, but due to the small sensor size only a fraction of the user's fingerprint attributes may be evaluated, resulting in a security level comparable to a three-digit PIN.

Furthermore, the popularity of so-called virtual smart cards has increased significantly. For example, a virtual smart card may be based on the Host Card Emulation (HCE) technology provided by Google. Using HCE, a smart card may be 'emulated', i.e. represented by means of software. A virtual smart card may be implemented by means of a software application running on a central processing unit of a mobile device, for example. In order to use such a virtual smart card securely, a user needs to authenticate towards the virtual smart card.

It is common practice to use the existing user interface of a mobile device for the entry of user authentication credentials. For example, these credentials may comprise a PIN, a password or an activation gesture. These user authentication methods are typically based on user entry under control of the mobile device's operating system. However, if the mobile device is infected by key logger software then the entry of the credentials may be intercepted and forwarded to unauthorized third parties via existing communication channels, which might decrease the level of security.

SUMMARY

There is disclosed a mobile device comprising a processing unit for executing a host application, a user-interactive display and an authentication unit; wherein the authentication unit is arranged to receive an authentication request from the host application; wherein the authentication unit is arranged to cause the display to show a set of pictures in response to receiving the authentication request; wherein the authentication unit is further arranged to identify a selection of at least one picture from said set of pictures; and wherein the authentication unit is further arranged to initiate a verification of said identified selection.

According to an illustrative embodiment, the authentication unit is arranged to be controlled by the host application.

According to a further illustrative embodiment, the set of pictures comprises a subset of pictures that have been predefined as positive identification pictures.

According to a further illustrative embodiment, the authentication unit is further arranged to empty said subset upon or after completion of the verification.

According to a further illustrative embodiment, the display is arranged to show said set of pictures by displaying an overlay image comprising said set of pictures.

According to a further illustrative embodiment, the authentication unit is further arranged to compile said overlay image.

According to a further illustrative embodiment, the authentication unit is further arranged to receive the overlay image in precompiled form.

According to a further illustrative embodiment, the authentication unit is further arranged to control said display.

According to a further illustrative embodiment, the authentication unit is further arranged to have exclusive control of said display.

According to a further illustrative embodiment, the authentication unit is further arranged to cause the display to show at least one further set of pictures, to identify at least one further selection from said set of pictures, and to initiate at least one further verification of said further identified selection.

According to a further illustrative embodiment, said selection comprises one picture, a group of pictures or a sequence of pictures.

According to a further illustrative embodiment, the mobile device is a mobile phone, a tablet device or a portable computer.

According to a further illustrative embodiment, the host application is a virtual smart card.

Furthermore, there is disclosed a method of authenticating a user using a mobile device, said mobile device comprising a processing unit for executing a host application, a user-interactive display and an authentication unit; wherein the authentication unit receives an authentication request from the host application; wherein the authentication unit causes the display to show a set of pictures in response to receiving the authentication request; wherein the authentication unit further identifies a selection of at least one picture from said set of pictures; and wherein the authentication unit further initiates a verification of said identified selection.

Furthermore, there is disclosed a computer program comprising instructions which, when being executed by a mobile device, causes said mobile device to perform steps of a method of the kind set forth.

Furthermore, there is disclosed an article of manufacture comprising at least one non-transitory, tangible machine readable storage medium containing executable machine instructions for controlling or carrying out the following steps: receiving, by an authentication unit of a mobile device, an authentication request from a host application executed by a processing unit of the mobile device; causing, by the authentication unit, the display to show a set of pictures in response to receiving the authentication request; identifying, by the authentication unit, a selection of at least one picture from said set of pictures; and initiating, by the authentication unit, a verification of said identified selection.

Furthermore, there is disclosed a display with a set of displayed pictures, at least one of which has an attribute particular to an authorized user.

DESCRIPTION OF DRAWINGS

Embodiments will be described in more detail with reference to the appended drawings, in which.

DESCRIPTION OF EMBODIMENTS

In accordance with the present disclosure, a mobile device is equipped with a processing unit for executing a host application, with a user-interactive display and with an authentication unit. The authentication unit is arranged to receive an authentication request from the host application. Furthermore, the authentication unit is arranged to cause the display to show a set of pictures in response to receiving the authentication request. Furthermore, the authentication unit is arranged to identify a selection of at least one picture from said set of pictures, and to initiate a verification of said identified selection. Thereby, a relatively secure and convenient way of authenticating a user may be provided.

For example, the authentication may be based on the selection of pictures that have been predefined in an enrolment process as positive identification pictures. The pictures may represent the user's face and variations thereof, for example. During the enrolment process, the user may have marked the pictures that closely match his facial characteristics as positive identification pictures. Thereby, a subset of positive identification pictures may have been created. The remaining pictures of the set of pictures may be regarded as negative identification pictures by definition or they may have been marked automatically as negative identification pictures, for example. These negative identification pictures may, when they are selected during the authentication process, result in a negative verification result and consequently in an authentication failure. The positive and negative identification pictures may have a similar appearance, such that only an authorized user (for example the user whose face is represented) may be able to differentiate between them. The user authentication may be based on the selection of only one positive identification picture, on the selection of a group of positive identification pictures, or on the selection of a sequence of positive identification pictures.

Mobile devices are typically equipped with a user-interactive display such as a touch screen. Therefore, a user may select pictures by touching them with a finger. The touched positions may represent the selected pictures. The security level may be scaled by increasing the amount of authentication cycles, i.e. by repeating steps of the authentication process, and/or by increasing the amount of negative identification pictures in the displayed set of pictures. Furthermore, in case of a touch screen, the mobile device's touch controller may be controlled by the authentication unit during the authentication process. More specifically, the touch controller may be disconnected from components other than the authentication unit, which may further increase the level of security. The authentication unit may in turn be controlled by a secure host application, for example the virtual smart card that requested the authentication of the user. This may also increase the level of security.

The above-described approach may make use of the user's capability to identify correct pictures based on attributes which are known only to him or her, such as detailed facial characteristics. Furthermore, the approach may make use of the user's associative memory and the user's capability to differentiate also between slightly modified pictures, i.e. pictures with slightly changed, deleted or added attributes. The skilled person will appreciate that the pictures do not necessarily need to be pictures of the user's face. For instance, also objects familiar to the user may be shown. In that case, each picture may show a slight modification of said object. The position of an object or face in a picture may also have been changed, for example by moving, zooming, rotating, and turning. The pictures whose selection may result in a successful authentication may have been determined in an enrolment process, during which the user may have predefined these pictures as positive identification pictures. It might be easier for a user to remember these predefined positive identification pictures than an abstract PIN or a password. Furthermore, the entropy of a picture may be larger than the entropy of a number or a character, such that the level of security may be higher.

Figure 1:
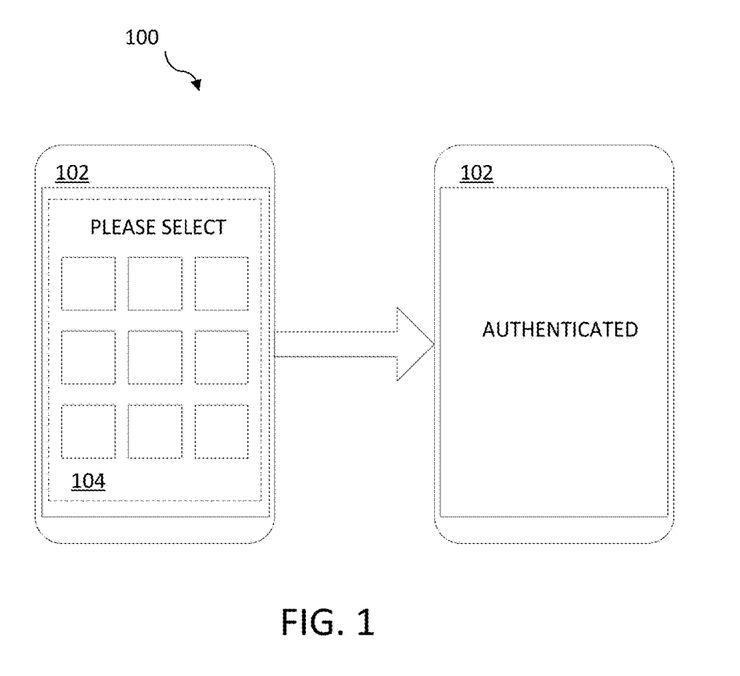
FIG. 1 shows an illustrative embodiment of a user authentication.

FIG. 1 shows an illustrative embodiment of a user authentication 100. The user authentication 100 comprises a selection of at least one picture from a set of pictures presented on the display of a mobile device 102. For example, the set of pictures may be comprised in an overlay image 104 displayed by said display. Upon or after a positive verification of the selected picture(s), the display may show a text indicative of a positive authentication result, such as 'authenticated'. The authentication unit may compile the overlay image 104 by randomly placing negative identification pictures between positive identification pictures. Furthermore, a text command such as 'please select' may be included in the overlay image 104. The overlay image 104 may effectively hide the screen content of the mobile device 102.

The compiled overlay image may be fed directly to a graphics controller of the mobile device in overlay mode, without connecting to a standard graphics memory or the mobile device's file system, for example. Thereby, data sniffing may be prevented. The overlay image may also be precompiled by a host application, in particular by a virtual smart card. Furthermore, the overlay image may be compiled by the authentication unit based on stored sets of positive and negative identification pictures. Furthermore, the authentication unit may use a morphing process in order to derive new negative identification pictures from existing ones, which may further increase the level of security.

The authentication unit may comprise a central processing unit (CPU) and storage memory (RAM, ROM). Furthermore, the authentication unit may be configured to execute software that controls the authentication process as well as the communication processes towards the mobile device platform and towards a host application. The authentication unit may be controlled by encrypted commands which may be decrypted and executed in a secure environment. The authentication unit may be configured to be controlled by the host application.

Figure 2:
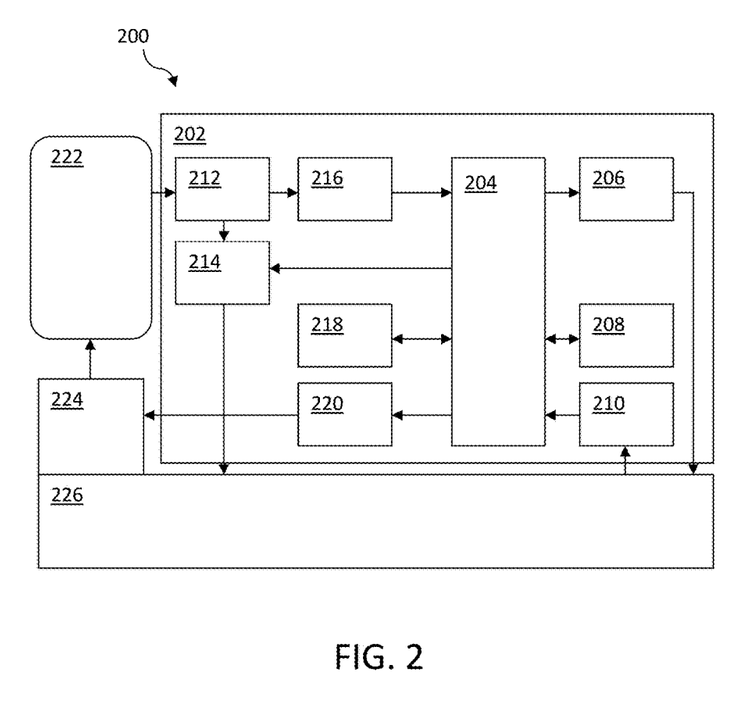
FIG. 2 shows an illustrative embodiment of an authentication system.

FIG. 2 shows an illustrative embodiment of an authentication system 200. The authentication system 200 comprises an authentication unit 202, a touch display 222, an overlay insertion controller 224 and a mobile device platform 226. The mobile device platform 226 comprises several components (not shown) which may interact with the authentication unit 202, such as a command interface for sending the above-mentioned encrypted commands to the authentication unit's decryption unit 210. Besides said decryption unit 210, the authentication unit 202 may comprise a central processing unit 204, an encryption unit 206, a memory unit 208, a touch display interface unit 212, a touch data gate 214, a position decoder 216, a secure attribute storage unit 218, and a challenge overlay generator 220. User input received by the touch display 222 may be forwarded to the mobile device platform 226 through the touch display interface unit 212 and the touch data gate 214. The central processing unit 204 may control the touch data gate 214 and for example switch it off, so that the authentication unit 202 may have exclusive control of the touch display 222 during the authentication process, for example. The encryption unit 206 may encrypt data which may be sent to the host application for verification through the mobile device platform 226, for example. The secure attribute storage unit 218 may store positive and negative identification images, for example. The central processing unit 204 may be arranged to run application software. The application software may receive encrypted commands from the host application through the mobile device platform 226. These commands may be decrypted by the decryption unit 210 using a public key that corresponds to a private key by means of which the commands have been encrypted by the host application, for example.

Figure 3:
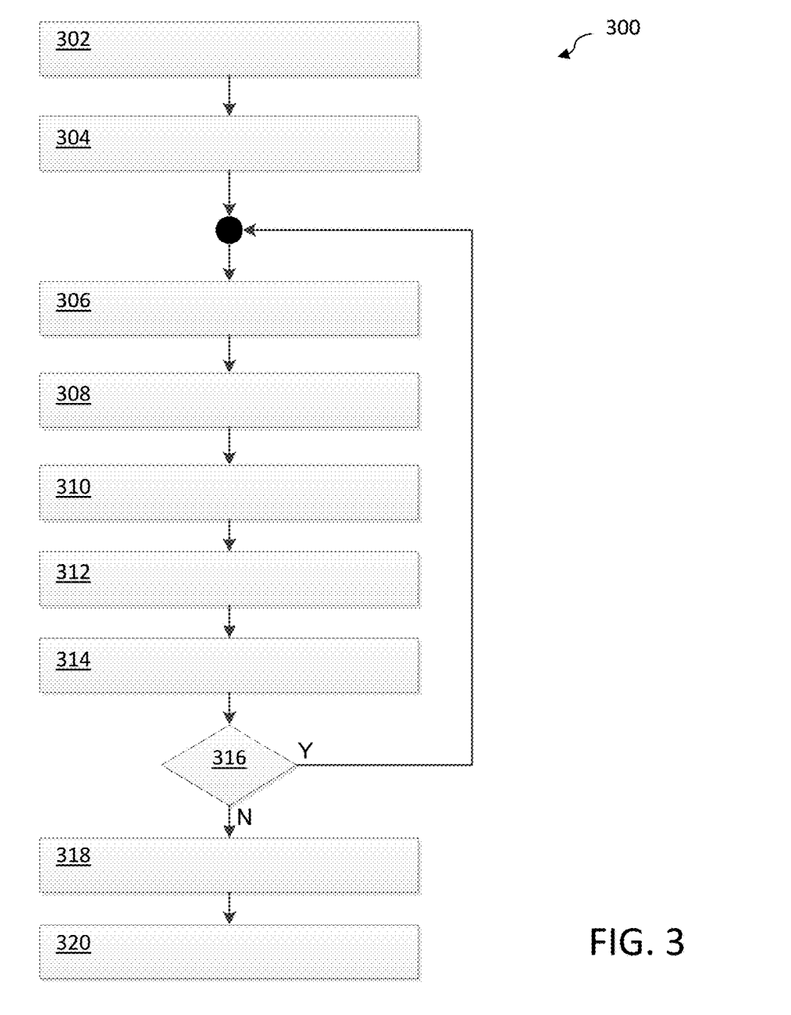
FIG. 3 shows an illustrative embodiment of an authentication method.

FIG. 3 shows an illustrative embodiment of an authentication method 300. The authentication method 300 may comprise the following steps. A host application may request 302 authentication of a user, for example before executing a transaction with a cloud service. For instance, the host application may be a virtual smart card which carries out monetary transactions through the internet. The touch display may be disconnected 304 from the mobile device platform in order to isolate the user authentication process and thereby further increase the level of security. Thus, in this way the authentication unit may have exclusive control of the touch display. A challenge picture set may be sent 306 to the authentication unit. That is to say, the authentication unit receives a set of pictures which may be used as a so-called challenge to the user. The set of pictures may contain positive and negative identification pictures. The authentication unit may compile an overlay image based on said challenge picture set, or the authentication unit may receive a precompiled overlay image which comprises said challenge picture set. The challenge picture set may be provided 308 to the challenge overlay generator. The challenge overlay generator will either forward the precompiled overlay image to the overlay insertion controller, or compile an overlay image based on the challenge picture set and send the compiled overlay image to the overlay insertion controller. The overlay insertion controller may control the process of displaying the overlay image on the touch display. A user may select 310 one or more pictures shown in the overlay image by touching them with a finger or a stylus, for example. Identified positions corresponding to the selected pictures may be sent 312 to the host application for further processing. These positions may be sent to the host application as encrypted data. The host application may verify 314 the identified positions, for example by comparing them with stored positions corresponding to positive identification pictures. Furthermore, it may be determined 316 whether a new authentication cycle is required. If this is the case, steps 306 to 314 may be repeated. Furthermore, an authentication result may be displayed 318 on the touch display, for example the text 'authenticated'. Furthermore, the touch display may be reconnected 320 to the mobile device platform.

Figure 4:
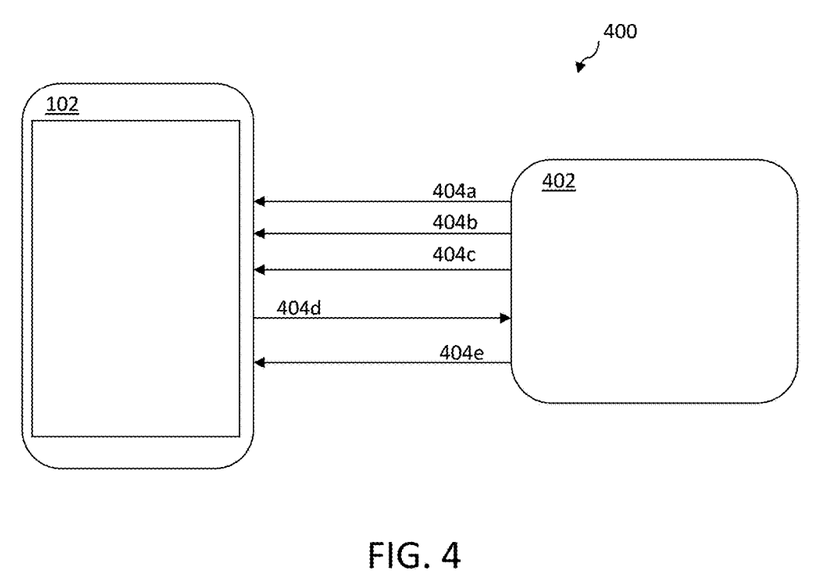
FIG. 4 shows an illustrative embodiment of a data flow in an authentication method.

FIG. 4 shows an illustrative embodiment of a data flow 400 in an authentication method of the kind set forth. A host application 402, for example a virtual smart card, may send an authentication request 404a to the authentication unit within the mobile device 102. Furthermore, the host application 402 may send authentication control data 404b to the authentication unit, as well as a challenge picture set 404c. One or more identified positions 404d, which are indicative of pictures selected by the user, may be sent to the host application 402. Furthermore, the host application 402 may send an authentication result 404e to the authentication unit. It is noted that, although the host application 402 has been shown as external to the mobile device 102, it may typically reside in the mobile device 102, where it may executed by a central processing unit of the mobile device 102, for example.

Various processes may be used for compiling an overlay image. For example, application software running on the authentication unit may compile new negative identification pictures, for example by morphing at least one negative and one positive identification picture in order to create non-authentic variants of positive identification pictures, which are subsequently marked as negative identification pictures. The authentication unit may subsequently create an overlay image based on the positive identification pictures, the negative identification pictures and a text command such as 'please select'. Furthermore, positive identification pictures may be clustered into groups, for example portraits of friends, portraits of children, pets, cars, holiday locations.

As mentioned above, according to an illustrative embodiment the authentication unit may be further arranged to empty the subset of positive identification pictures upon or after completion of the verification of the identified selection. Thereby, a higher level of security may be achieved, because the positive identification pictures—which represent sensitive data—may need to be stored for a smaller amount of time in the authentication unit. This embodiment may be implemented as a scratch list of positive identification pictures which are used in the authentication process and which may be removed from said scratch list when the authentication process has terminated. When the scratch list is empty a new enrolment process may be required in order to define new positive identification pictures.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 user authentication
102 mobile device
104 overlay image
200 authentication system
202 authentication unit
204 central processing unit
206 encryption unit
208 memory unit
210 decryption unit
212 touch display interface unit
214 touch data gate
216 position decoder
218 secure attribute storage unit
220 challenge overlay generator
222 touch display
224 overlay insertion controller
226 mobile device platform
300 authentication method
302 host application requests authentication
304 disconnect touch display from mobile device
306 send challenge picture set to authentication unit
308 provide challenge picture set to overlay generator
310 user selects picture(s)
312 send identified position(s) to host application
314 host application verifies the position(s)
316 new authentication cycle?
318 display authentication result
320 reconnect touch display to mobile device
400 data flow in authentication method
402 host application
404a authentication request
404b authentication control data
404c challenge picture set
404d identified position(s)
404e authentication result

The invention claimed is:
1. A mobile device comprising
a processing unit configured to execute a host application;
a user-interactive display; and
an authentication unit configured to:
receive an authentication request from the host application, cause the user-interactive display to show an initial set of pictures comprising a plurality of negative and positive identification pictures, in response to receiving the authentication request, wherein a morphing process is used to derive negative identification pictures from the initial set of pictures by morphing at least one negative and one positive identification picture,
identify a subset including one or more positive identification pictures distinguished from the negative identification pictures in said initial set of pictures,
initiate a verification of said identified subset, and
empty said subset including the one or more positive identification pictures upon or after completion of the verification.

2. The mobile device as claimed in claim 1, wherein the authentication unit is configured to be controlled by the host application.

3. The mobile device as claimed in claim 1, wherein the user-interactive display is configured to show said initial set of pictures by displaying an overlay image comprising said initial set of pictures.

4. The mobile device as claimed in claim 3, wherein the authentication unit is further configured to compile said overlay image.

5. The mobile device as claimed in claim 3, wherein the authentication unit is further configured to receive the overlay image in precompiled form.

6. The mobile device as claimed in claim 1, wherein the authentication unit is further configured to control said user-interactive display.

7. The mobile device as claimed in claim 6, wherein the authentication unit is further configured to have exclusive control of said user-interactive display.

8. The mobile device as claimed in claim 1, wherein the authentication unit is further configured to cause the user-interactive display to show at least one further set of pictures, identify at least one further selection from said at least one further set of pictures, and initiate at least one further verification of said further identified selection.

9. The mobile device as claimed in claim 1, being a mobile phone, a tablet device, or a portable computer.

10. The mobile device as claimed in claim 1, wherein the host application is a virtual smart card.

11. A method of authenticating a user using a mobile device, said mobile device comprising a processing unit for executing a host application, a user-interactive display, and an authentication unit, the method comprising:
receiving, with the authentication unit, an authentication request from the host application;
causing, with the authentication unit, the user-interactive display to show an initial set of pictures comprising a plurality of negative and positive identification pictures, in response to receiving the authentication request, wherein a morphing process is used to derive negative identification pictures from the initial set of pictures by morphing at least one negative and one positive identification picture;
identifying, with the authentication unit, a subset including one or more positive identification pictures distinguished from the negative identification pictures in said initial set of pictures;
initiating, with the authentication unit, a verification of said identified subset; and
emptying, with the authentication unit, said subset including the one or more positive identification pictures upon or after completion of the verification.

12. An article of manufacture comprising at least one non-transitory, tangible machine readable storage medium containing executable machine instructions, the article comprising:

instructions for receiving, by an authentication unit of a mobile device, an authentication request from a host application executed by a processing unit of the mobile device;

instructions for causing, by the authentication unit, a user-interactive display to show an initial set of pictures comprising a plurality of negative and positive identification pictures, in response to receiving the authentication request, wherein a morphing process is used to derive negative identification pictures from the initial set of pictures by morphing at least one negative and one positive identification picture;

instructions for identifying, by the authentication unit, a subset including one or more positive identification pictures distinguished from the negative identification pictures in said initial set of pictures;

instructions for initiating, by the authentication unit, a verification of said identified subset; and instructions for emptying, by the authentication unit, said subset including the one or more positive identification pictures upon or after completion of the verification.

13. The mobile device of claim 1, wherein the identified subset has detailed facial characteristics of a user of the mobile device.

* * * * *